INVENTOR.
GAYLE R. NORBERG
BY Thomas J. Devine
ATTORNEY

INVENTOR.
GAYLE R. NORBERG
BY Thomas G. Devine
ATTORNEY

April 21, 1970 G. R. NORBERG 3,508,206

DIMENSIONED INTERRUPT

Filed May 1, 1967 5 Sheets-Sheet 3

INVENTOR.
GAYLE R. NORBERG
BY Thomas J. Devine
ATTORNEY

April 21, 1970 G. R. NORBERG 3,508,206

DIMENSIONED INTERRUPT

Filed May 1, 1967 5 Sheets-Sheet 4

INVENTOR.
GAYLE R. NORBERG
BY Thomas G. Devine
ATTORNEY

INVENTOR.
GAYLE R. NORBERG
BY Thomas J. Devine
ATTORNEY 3,508,206

DIMENSIONED INTERRUPT

Gayle R. Norberg, Columbia Heights, Minn., assignor to Control Data Corporation, Minneapolis, Minn., a corporation of Minnesota Filed May 1, 1967, Ser. No. 635,153
Int. Cl. H04j 3/14
U.S. Cl. 340—172.5 5 Claims

ABSTRACT OF THE DISCLOSURE

An apparatus for interrupting the operation of a digital computer from a plurality of remote equipments wherein the time delay imposed upon the computer to recognize and process the interrupting signal is minimized.

This invention relates to communication of program control information in control sequences, computers, or complexes of computing machines. More particularly, it encompasses a method of exchanging information which greatly simplifies the programming of such systems, as well as inventive embodiment of the method.

The principle of signalled interruption of a programmed sequence to perform another of more urgency, with later return to the original sequence, is not new in the art. The interruption has also long been used as a method of obtaining greater concurrency of tasks by assigning them to several independent units in a system, then proceeding with another main task which is to be interrupted by each independent unit upon completion of its assigned task.

An example would be a computer system with a punched-card reader, a magnetic tape reader, and a magnetic tape recording unit attached to a central memory and arithmetic processing unit. The main task might be to read and digest the information on the magnetic tape reader into more concise form, and the secondary task to read a deck of punched cards, sort out certain of them, and record the sorted information on the tape recorder.

In this example, the program sequence would properly first order the card reader to read and deliver the card information to a specified place in its memory. The sequence would not wait for completion of the order, because the card reader is a relatively slow device, but rather would then proceed to order the magnetic tape reader to send its information for the main task. The magnetic tape reader, being much faster than the card reader, would finish its task much earlier, whereupon the central processor would proceed with the main task of digesting the data from the tape reader. While the main task is proceeding, the card reader will have completed its input, whereupon it issues an interrupt signal to the central processor to indicate the completion. At this point, the central processor will mark its place in the main task and jump or branch to a special program sequence location where the interrupt is processed, as described in detail later herein.

The result of processing the interrupt will be to enter a new sequence of programmed steps defining the secondary task. The desired sorting will be done, and sorted results stored in a specific memory area. Then the magnetic tape recorder will be instructed to record the contents of that memory area. Again, the central processor does not await completion of the recording, but returns immediately to the place it had previously marked in the main task, thereby accomplishing productive work while the recorder is recording. The secondary task may reiterate several times with new data before completion of the main task.

It can be seen from this example that considerable overlap of activity in the system is made possible by means of the interrupt, since at least two waiting periods were eliminated, with the attendant increase of computing efficiency.

Processing the interrupt in the special program sequence provided for that purpose is complicated and increases greatly in complexity as a greater number of concurrently-operating devices are added to the system.

In the system of the example, the sequence would first store all intermediate results of the main task in the computer registers to avoid having to re-compute them and to free the central processor's operational registers for use in the interrupt program sequence.

Secondly, the sequence would cause the central processor to interrogate each individual equipment in the system in order, so as to determine the origin and nature of the interrupt, since it can originate in at least two of them in the example and perhaps in the third in another task. The alternatives to this procedure are to keep constant track of the current status of every equipment in the system or to limit the possibilities of interrupt origination in some other way. It can readily be seen that the first alternative yields a very complex program and the second limits the usefulness of the interrupt system. The situation worsens as system size increases.

Some attempts have been made to alleviate this problem by providing a separate interrupt line for each equipment, allowing each to cause a program transfer to its own special interrupt location and program, thereby eliminating the interrogation steps. This has been a very expensive approach, requiring much specialized circuitry and many communication lines. Other attempts have compromised this approach, being satisfied to reduce the number of interrogations necessary by separating the machines into several groups, with each group having its own interrupt line and its own interrupt transfer location. Several distinct interrupt processing subprograms result, so less total interrogation is necessary in processing any given interrupt, but little if any saving of memory space is accomplished. Any saving of specialized circuitry is at the expense of limiting the usefulness of the interrupt system. In all these approaches some specialized circuitry to accommodate all interrupts in the largest possible system must be incorporated in the central processor, making it more costly than necessary in small systems.

Thirdly, the interrupt program sequence decides the next proper action to be taken, i.e., which secondary task to perform. In the example there is only one, but there usually are more. The sequence might then decide upon priority among them, taking the necessary bookkeeping steps to be sure none of them are forgotten. In addition a given machine might deliver two interrupts, one to show its operation is complete, and another to show that an error occurred during the operation. It might be necesary to perform a second interrogation to learn more details of the situation. Obviously, the error should be handled first, since it may affect related tasks or further progression through the current task. Circuitry has been used to control and simplify the priority determination by means of masks controlled by the programmer to enable or disable recognition of interrupts at particular times, and by means of special registers holding interrupt indications which are scanned in a fixed, selectively ordered manner. In some cases, the ordering can be changed by program. As in the case of methods used to reduce interrogation requirements mentioned earlier, the special circuitry is centralized in the central processor. Much of such circuitry has proven expensive and complicated to use.

Finally, the sequence would restore the partial results of the main task, which had been previously stored, and return to the main task at the point marked earlier.

This example in a simple system shows the complexity of interrupt processing. In large systems, many millions of dollars and years of effort have been expended writing master programs to relieve the casual user of the system from the burden of understanding and operating the workings of its interrupt system. The increased efficiency of the machines with interrupt features have made such efforts worthwhile, but they could be more so. When such involved interrupt processing programs are used a considerable part of the central processor's operating time is occupied thereby, as well as considerable memory space. Accordingly, if ways can be found to reduce or eliminate steps in the processing of interrupts, great savings can be made.

The interrupt technique has not been applied greatly in the area of control sequencing, but this invention will make it practical to do so. Many control sequencing systems, particularly the larger ones, employ computers to direct operations, and thus become classed as computer systems having many associated peripheral devices. But certainly in many situations, such as emergencies arising in the operation of a processing plant, or in the countdown preceding firing of a rocket, or the operation of an automatic typesetting machine, the concept can be applied to sequencing controls of lesser complexity than a computer.

In such cases several emergencies might occur at once, with several alternative courses of remedial action evident. A simple sequencer would not possess the sophistication to handle the problem properly, and a complex one would be expensive. This invention affords simpler sequencers the ability to cope with such problems at low cost. In fact, it will have application wherever more than one task must share a common facility on a non-synchronous basis.

Accordingly, it is an object of this invention to provide a method of interrupting sequencing and computing machines which greatly simplifies processing of the interrupts.

Another object of the invention is to provide a novel combination of electronic or mechanical components to accomplish this desired simplification of interrupt processing.

Still another object of this invention is to extend the concept of program sequence interrupt to sequencing systems other than stored-program computers.

A related object is to show a method of interrupting which makes such extension of the interrupt concept feasible for simpler systems.

Another object of this invention is to reduce the amount of special circuitry required for interrupts in a central memory and arithmetic or control processor so a less expensive minimum size system can be made.

Yet another object is to provide a method of interrupting programmed sequences wherein the characteristics of the method may be varied without changing the central sequencer.

Still another object is to provide automatic priority establishment in an interrupt system to relieve program writers of part of this effort.

A related object is to provide an interrupt system wherein priorities may be varied to suit a system or job even on a day-to-day basis, without reprogramming the system.

Another object of this invention is to provide a program interrupt system wherein the complexity of the interrupt facility may be increased without changing the central processor.

A further object is to provide a method of interrupting data processing machines which will allow greater interchangeability of programs between different systems having similar machines.

An important object of the present invention is to eliminate the need for time-consuming interrogation of interrupting equipments.

Still another object is to permit simple direct control of several independently operating sequencers or computers by one master controlling sequencer or computer.

Another object is to provide a system sequence interrupt scheme wherein the interrupt priority decisions are made at the point of interrupt signal origination, where it may be done most efficiently.

Yet another object of the invention is to make a central processor program interrupt facility wherein the facility is simple and generalized and the specifics of any particular interrupt situation are supplied by the interrupting equipment.

Another object of the invention is to provide a data processor program interrupt facility which allows writing of the interrupt processing program in discrete separate parts, each related only to one machine or to one condition and independent of the other parts.

Another object is to provide a novel interrupt-enabling system which allows many remote units to decide among themselves which one shall interrupt, relieving the central machine of this chore.

Still another object is to make a data processor or computer interrupt facility whose characteristics can be modified manually in a short time.

A more complete understanding of these objects and how the subject invention accomplishes them will be made clear by the following description and appended claims.

At the heart of this invention is a radical change of emphasis in the operational philosophy of interrupts. It makes most of the aforegoing objects possible and suggests the embodiment of the remaining ones.

Before this invention, interrupt facilities have been based upon specialized circuits in the central processor which recognize, control, and discriminate between incoming interrupt signals. The interrupting device or devices contributed only one thing to the operation, namely, the single fact that some one of many possible events has occurred. It is left to the program to interrogate, control, and discriminate further, at the expense of time and memory space. The central processor or sequencer, therefore, has contained virtually all of the specialized facility except for bare detection of the interrupt-producing conditions. The specifics of any interrupt situation are determined in this program.

In this invention this emphasis is greatly changed. The interrupting equipment or machine directly supplies all the specifics of the situation automatically at the same time it delivers the interrupt. The central processor contains only the generalized circuitry necessary to accept the information so sent. Since the conditions causing the interrupt arise within the framework of the interrupting equipment, that equipment is in the best position to specify the situation because it has only a few alternatives to choose between. It has a much simpler task, for example, of choosing which interrupt to send first, when an end-of-operation and an error have both been registered.

A comparison of the old method of interrupting with that of the present invention is tabulated below:

| Old method | Dimensioned interrupt |
|---|---|
| 1. Remote equipment generates an interrupt signal. | 1. Remote equipment generates an interrupt signal. |
| 2. Computer receives interrupt sig- and interrupts its program. | 2. Dimensioned interrupt receives interrupt signal, resolves priority conflicts, and generates an interrupt identification number. |
| 3. Computer interrogates remote equipment to obtain interrupt source identification, interrupt type, priority level, etc. | 3. Computer receives interrupt identification number, interrupts its program, and goes directly to the proper interrupt program. |
| 4. Computer analyzes interrogation information, and determines which interrupt program is to be selected. | |
| 5. Computer goes to the proper interrupt program. | |

Note that the interrogation (step 3) required by the old method has been eliminated. Note also that in the old method, action was required by the computer from the time it received the interrupt signal until it finally addressed the proper interrupt program. The dimensioned interrupt eliminates these time-consuming computer operations and frees the computer for other functions. The bulk of priority determination has been transferred from an involved program in the old system to the dimensioned interrupt and remote equipment.

The specific details and entire scope of the invention will become more fully apparent when considered in light of the following detailed description of an illustrative embodiment of the invention and from the appended claims.

The illustrative embodiment may be best understood by reference to the accompanying drawings, wherein.

Figure 1:
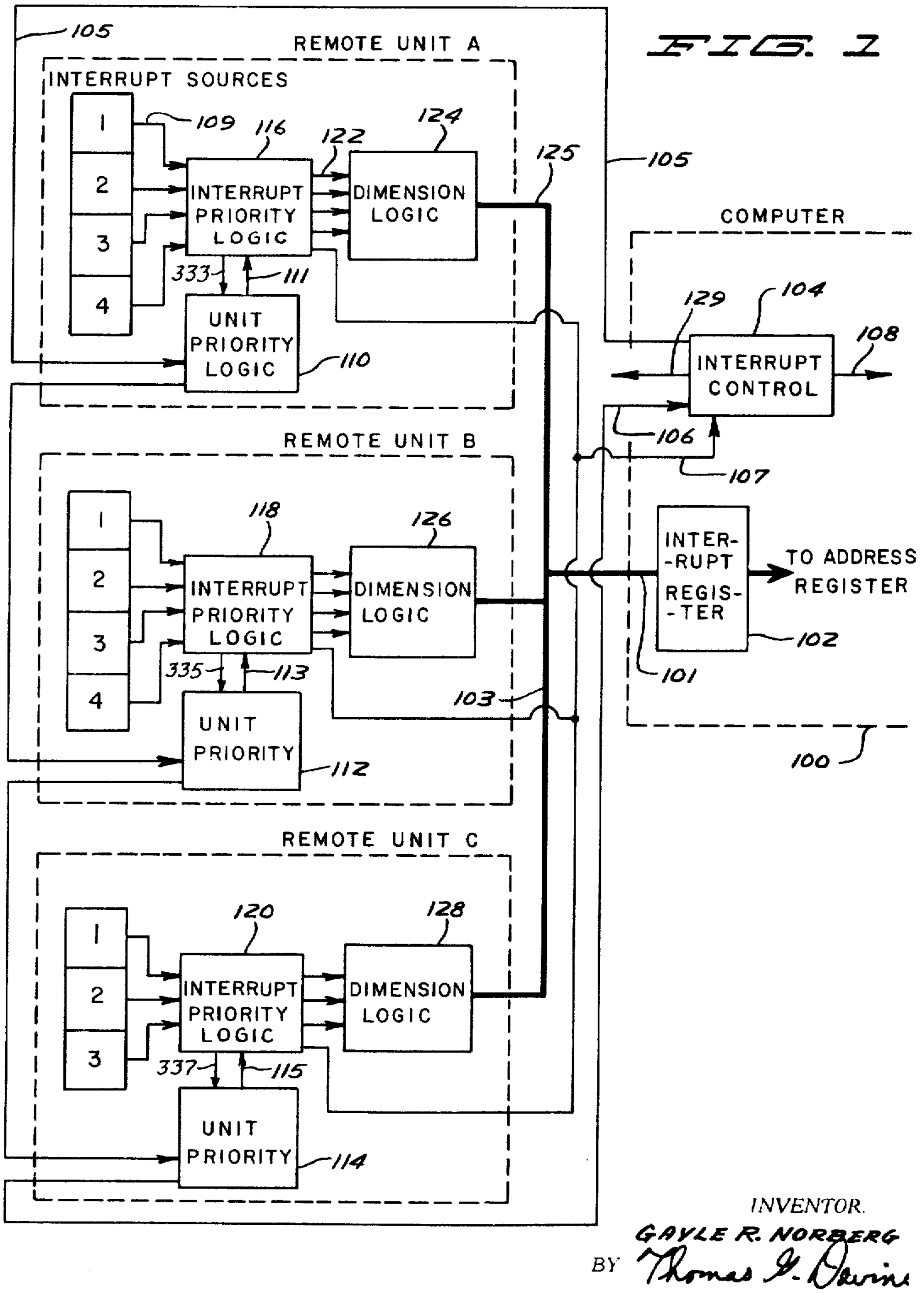
FIGURE 1 is a block diagram illustrating three remote units connected to a central computer.

Referring first to FIGURE 1, a block diagram is shown which illustrates the relationship between three remote units and a central computer. These remote units may be equipment such as magnetic tape transports, card readers, magnetic disc files, or other peripheral equipment which typically communicates with a central computer. The central computer 100 has an interrupt register 102 whose input is connected to an input data channel 101 and whose output is connected to a computer program address register (not shown). The program address register is of a conventional type found in computers, used for the purpose of specifying a location in memory where digital program information is located. The size of the address register is dependent upon the size of the memory in the computer; for example, a 4,096 word memory requires a 12-stage address register in order to uniquely assign a different address number for each of the 4,096 memory locations. Input data channel 101 is connected to common data bus 103 which in turn is used as a common transmission path between each of the plurality of remote units and the central computer.

The computer 100 also has an interrupt control 104 which generates a unit priority signal on unit priority line 105 for serial transmission through each of the remote units. If no remote units generate an interrupt, the unit priority signal is subsequently transmitted back to interrupt control 104 via line 106. Interrupt control 104 then regenerates the unit priority signal over unit priority line 105. Interrupt control 104 detects that an interrupt has occurred by monitoring interrupt sense line 107, which is activated by signals from any of the remote units whenever an interrupt condition occurs in a remote unit. When an interrupt is sensed via line 107, interrupt control 104 generates the command signals necessary to transfer the contents of interrupt register 102 into the computer's program address register. This command signal is sent over interrupt control output line 108. After an interrupt has been processed by the computer, the interrupt control sends a unit clear signal over line 129 (see FIGURE 3) to return all remote unit flip-flops to their initial state.

As FIGURE 1 illustrates, the data outputs from each of the remote units are connected to a common data bus 103 which in turn is coupled to the computer input channel 101. The use of this common data bus requires that only one interrupt be processed at any given time, which in turn requires that the system have a priority control to lock out all interrupts except the one being currently operated on. This lock out is accomplished in two levels: first, the active interrupt in a particular remote unit is reserved and all other interrupts in that unit are locked out; and second, the remote unit containing an active interrupt is reserved and all other remote units are locked out. For example, when interrupt source #1 in remote unit A becomes active, it generates a signal over line 109 to interrupt priority logic 116. Interrupt priority logic 116 locks out interrupt sources 2, 3, and 4 to prevent any interrupt signal which might be generated by them from being recoginzed. When the unit priority signal arrives via line 105, it is stopped by unit priority logic 110 and prevented from passing on to the next remote unit. This prevents all subsequent remote units from recognizing interrupts which may become active while the interrupt in remote unit A is being processed. The unit priority signal also causes unit priority logic 110 to energize line 111, which enables the interrupt priority 116 to energize output line 122. Line 122 is sensed by dimension logic 124, and is translated into a binary number of predetermined magnitude. This binary number is transmitted, via remote unit A output channel 125, to the common data bus 103, and from there to interrupt register 102 via input data channel 101. At the same time, the interrupt priority logic 116 activates interrupt sense line 107. When this line becomes active, it is sensed by interrupt control 104, and interrupt control 104 generates command signals over line 108 to transfer the contents of interrupt register 102 to the computer program address register and to direct the computer to read its next instruction from the address indicated by the contents of the program address register. After the interrupt has been processed, interrupt control 104 generates clear signals to return the unit priority logic 110 and the interrupt priority logic 116 to their original states. The unit priority signal is then sent over unit priority line 105 to remote unit B, and the operation of the system now begins anew with respect to remote unit B.

FIGURE 1 illustrates three remote units for purposes of illustration. It can be seen that these remote units are substantially identical, except for the number of interrupt sources which they contain. It is to be understood that any number of remote units can be connected in the manner illustrated in FIGURE 1, and each remote unit may have any number of interrupt sources. For example, if remote unit A were to be considered a magnetic tape transport, then interrupt source #1 would be a circuit designed to sense for an end-of-tape condition, and line 109 would become activated when this condition was present. Interrupt source #2 would be designed to sense for a parity error condition, and interrupt source #3 would be designed to sense when an end of operation has occurred, and interrupt source #4 would be designed to sense when the tape is properly positioned and ready to be read.

The internal design of interrupt priorities 116, 118, and 120 are identical; therefore, a description of one of them will suffice. The same is true of unit priority logic 110, 112, and 114. The internal design of dimension logic 124, 126, and 128 is similar, differing only in that each dimension logic is designed to generate different output binary signals when its respective input lines are activated. This is necessary to provide a unique numerical identity for each and every interrupt source contained within the total system. A description of the design of one dimension logic will suffice to clearly indicate how this design may be modified to provide other binary signal combinations when a given input is active.

Each interrupt source comprises a flip-flop of conventional design in the art whose input is connected to a sensor which is designed to detect the condition which generates the interrupt. Thus, the interrupt sources differ from one another to the extent necessary to accommodate different types of sensors and sensing means. For example, an end-of-tape condition is conventionally detected by means of a photocell which senses a reflective spot placed near the end of the tape. The parity error condition is conventionally detected by means of a high speed electronic comparator circuit which compares the information bits as they are written or read from magnetic tape. This invention is not directed at the means by which interrupts may be sensed, but depends upon the fact that whatever sensing means are used, they may be converted into an appropriate electrical signal for setting a flip-flop in the remote unit.

Figure 2A:
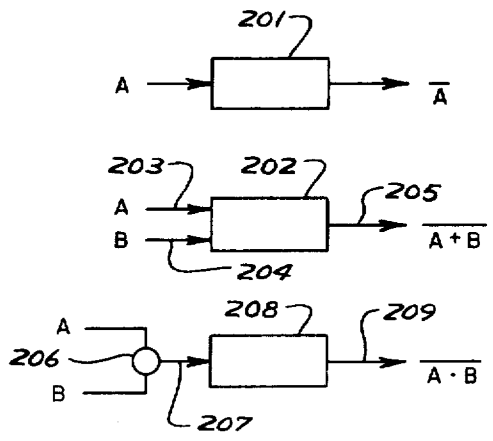
FIGURES 2A–2C illustrates the logic symbols used in the remaining figures to explain the operation of the invention.

Referring now to FIGURE 2, the logic symbols which are used in the remainder of this specification are described. These symbols can be implemented through the use of electronic circuits which are known in the art. See for example, Patent 3,092,729, "Bi-Level Amplifier and Control Device," issued to S. R. Cray. FIGURE 2A illustrates a typical NOR circuit with several logical combinations. If a signal A is applied to the input of NOR circuit 201, the inversion of the signal, $\overline{A}$ appears at its output. If signal A is applied to input 203 of NOR circuit 202, and a signal B is applied to input 204 of NOR circuit 202, the signal at output 205 is $\overline{A+B}$. If a signal A and a signal B are applied to AND gate 206, the signal at input 207 of NOR circuit 208 is $A \cdot B$, and the signal on output line 209 is $\overline{A} \cdot \overline{B}$. Selected AND gate-NOR circuit combinations will yield any desired logic configuration.

Figure 2B:
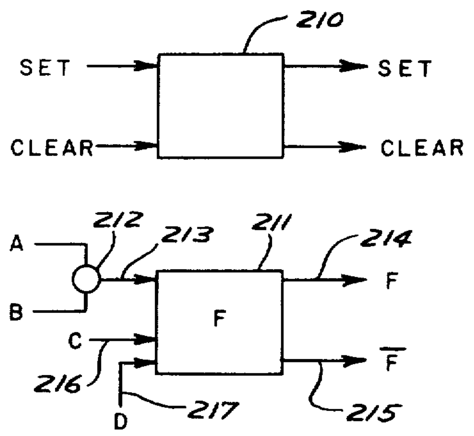

FIGURE 2B illustrates typical flip-flops, which have the capability of retaining an output signal after the input signal has been removed, thereby acting as a storage device. Flip-flop 210 illustrates the conventional labels which are utilized in describing the operation of a flip-flop. The top input and the top output are conventionally labeled the "set input" and "set output" respectively. If a "set" signal is applied to the top input, it will appear at the top output, and will be retained there after the "set" signal at the input is removed. Likewise, if a "clear" signal is applied to the bottom input and later removed, the "clear" output will retain that signal. The "set" and "clear" outputs never have the same output signal applied on them. If one output has a logical "1" applied on it, the other output will have a logical "0" output. By design constraint, both inputs never have a logical "1" applied to them at the same instant of time, although both inputs may have logical "zeroes" applied to them simultaneously, as for example, when a "1" signal has been applied to one of the inputs and subsequently removed. Flip-flop 211 illustrates a conventional flip-flop with a more complex input logical configuration. In this case, if a signal A and a signal B are applied to AND gate 212, input line 213 will be at a voltage representative of a logical "1." This will cause set output line 214 to become a "1," and clear output line 215 to become a "0." If a signal C is applied to clear input 216 or a signal D is applied to clear input 217, clear output line 215 will become a "1," and set output line 214 will become a "0." If the condition which flip-flop 211 stores is designated as "F," the presence of the condition "F" will be indicated by a "1" at the set output 214. The absence of the condition "F" will be indicated by a "1" at the clear output 215.

Figure 2C:
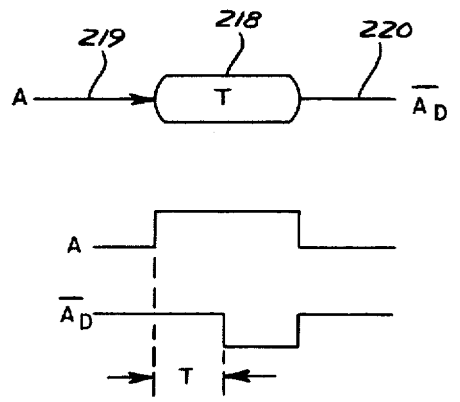

FIGURE 2C illustrates the symbol for a delay circuit. If a signal A is applied to input 219 of delay 218, the inversion of signal A, or $\overline{A}$, will appear on output 220 a predetermined time interval T later. The delay time interval T is preselectable and is typically of the order of one microsecond.

Figure 3:
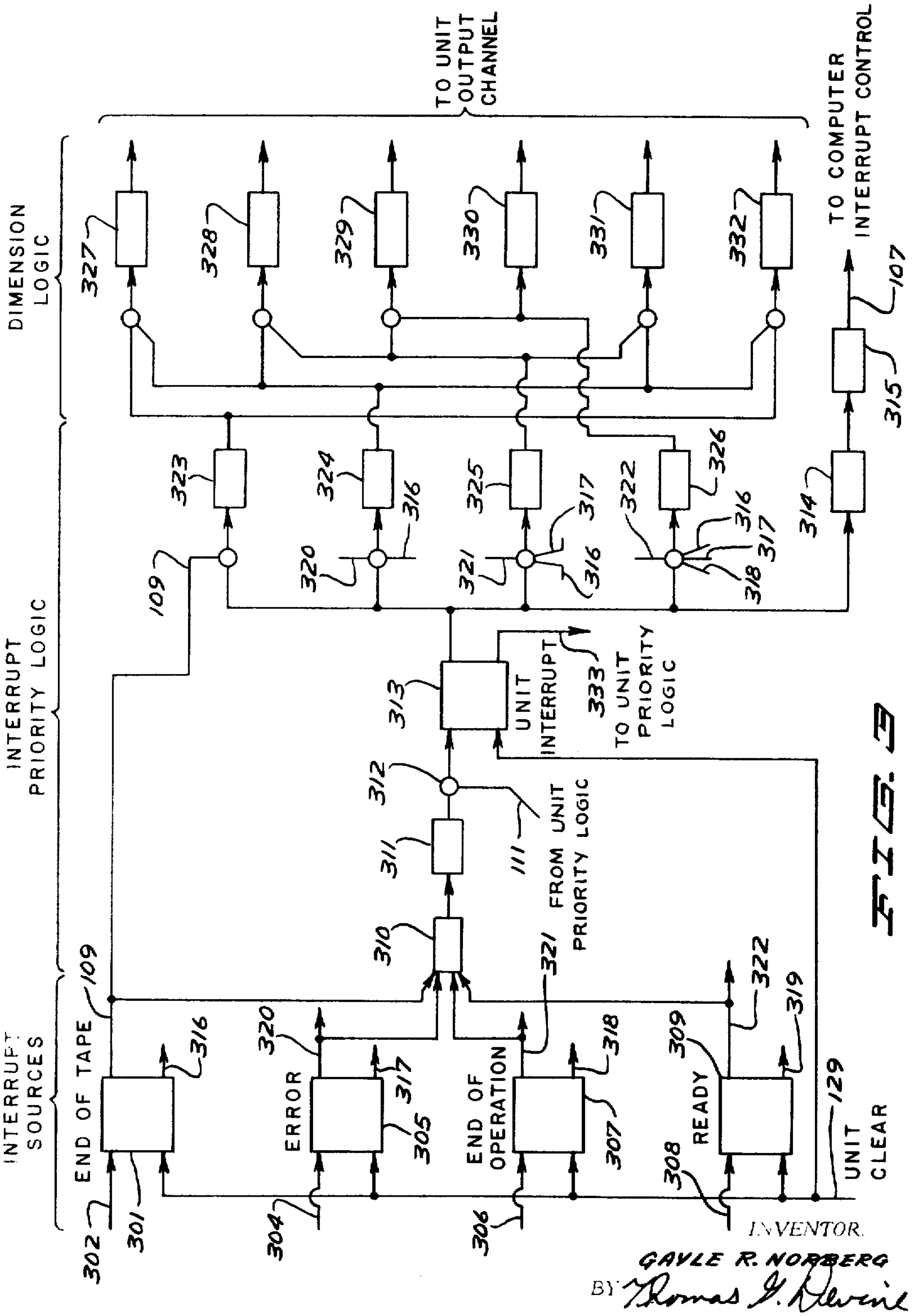
FIGURE 3 illustrates a logic diagram of the interrupt sources, priority logic, and dimension logic for a typical remote unit.

FIGURE 3 illustrates a logic diagram of the interrupt sources, priority logic, and dimension logic contained within a typical remote unit. Only the interrupt source flip-flops are shown, for it is presumed that the sensing means which are connected to the said input of the interrupt source flip-flops are conventional and known in the art. For example, the end-of-tape interrupt signal is typically generated by means of a photo cell which senses a reflective tape marker as previously described, and this signal is amplified and converted to an appropriate voltage level for use as input to the end of tape flip-flop 301. Thus, when the sensor detects the end of the tape, it generates a signal which ultimately is applied as a logical "1" to set input 302 of end-of-tape flip-flop 301. This causes set output 109 to become a logical "1," which in turn provides the interrupt signal for the end-of-tape condition. Other signals, when applied to set input 304 of error flip-flop 305, set input 306 of end-of-operation flip-flop 307, or set input 308 of ready flip-flop 309, will cause the respective interrupts to be generated and transmitted into the interrupt priority logic.

When any of the inputs to NOR circuit 310 become a logical "1," the output of NOR circuit 310 becomes a logical "0." This signal is passed to the input of NOR circuit 311, causing a "1" output from NOR circuit 311. This signal is transferred to AND gate 312, where it is combined with an enabling signal on line 111 from unit priority logic 110. This enabling signal is periodically present for a short time interval, and is caused by the receipt of the unit priority signal via line 105 at the unit priority logic 110 (FIGURE 1). The presence of a logical "1" at the output of NOR circuit 311 and on line 111 causes unit interrupt flip-flop 313 to set. The set output of flip-flop 313 is connected to NOR circuit 314, which in turn is connected to NOR transmitter circuit 315. NOR transmitter circuit 315 transmits a signal via line 107 to the computer interrupt control logic 104 (FIGURE 1). This signal causes computer interrupt control 104 to recognize that an interrupt has occurred and to subsequently provide the gating and command signals required to transfer the contents of the computer interrupt register 102 into a program address register or other register and to direct the computer to execute its next instruction from the indicated memory address or take other appropriate action.

The set output of unit interrupt flip-flop 313 is also connected via AND gates to the inputs of NOR circuit 323, 324, 325, and 326. These circuits are utilized to establish an interrupt priority in the event more than one of the interrupt source flip-flops are set. In this example, interrupt source flip-flop 301 is the only interrupt source flip-flop set, and this causes a logical "1" to be applied to set output line 109. Line 109 is connected to input AND gate to NOR circuit 323, and this line together with the set output from flip-flop 313, causes a logical "1" to appear at the input of NOR circuit 323. NOR circuits 324, 325, and 326 all have logical "zeros" applied to their inputs, because each of their input AND gates are connected to the clear output line 316 from flip-flop 301. Since the set output 109 of flip-flop 301 has logical "1" applied to it, the clear output line 316 must have a logical "0" applied to it, which disables all of the input AND gates to which it is connected. The output of NOR circuit 323 therefore becomes a logical "0," which signal is applied to the AND gate inputs of NOR transmitter circuits 327 and 332. This logical "0" applied to these inputs causes a logical "1" to appear at the outputs of NOR transmitter circuit 327 and 332. The outputs from the other NOR transmitter circuits will be logical "0," which fact can be determined as follows. It is evident that the outputs from NOR circuits 324, 325, and 326 are each logical "1" because each of these NOR circuits has a connection from the clear output of flip-flop 301 to their respective AND gate inputs. Since clear output line 316 of flip-flop 301 is a logical "0," all AND gates to which it is connected are disabled. Since each of the AND gate inputs into NOR circuits 324, 325, and 326 are disabled, the outputs from these NOR circuits are logical "1's." The outputs from NOR circuits 324 and 325 are combined at the input AND gate of NOR transmitter circuit 328, causing a logical "0" to appear at the output of NOR transmitter circuit 328. The outputs of NOR circuits 325 and 326 are combined at the input AND gate of NOR transmitter circuit 329, causing a logical "0" to appear at its output. The output of NOR circuit 326 is applied to the input of NOR transmitter circuit 330, causing a logical "0" to appear at its output. The outputs of NOR circuits 324 and 325 are combined at the input AND gate of NOR transmitter circuit 331, causing a logical "0" to appear at its output. Therefore, the binary output signals from NOR transmitter circuits 327 through 332 are 100001, or octal 41. This octal number is illustrated at the output of NOR circuit 323 as the output signal which will be transmitted from NOR transmitter circuits 327 through 332 when a logical "1" is applied to the input of NOR circuit 323. The outputs of NOR circuit 324, 325, and 326 are illustrated as 63, 32, and 14 respectively. These numbers indicate the octal representation of the binary output signals from NOR transmitter circuits 327 through 332 when a logical "1" is applied to the respective NOR circuits 324, 325, and 326. Therefore it can be seen that the activation of each of the NOR circuits 323 through 326 will result in the transmittal of a different binary signal combination from NOR transmitter circuits 327 through 332. These binary signals are transmitted over output channel 125 to the computer interrupt register 102 via input data channel 101.

Next, we will consider how the priority logic resolves conflicts when more than one interrupt source flip-flop becomes set by simultaneous interrupt signals. Assume that the end-of-tape interrupt signal arrives simultaneously with the error interrupt signal. Therefore, both flip-flops 301 and 305 will become set and their set outputs 109 and 320 will have logical "1" applied. The output of NOR circuit 310 becomes a logical "0," causing the output of NOR circuit 311 to become a logical "1." AND gate 312 becomes enabled when the next unit priority signal appears on line 111, thereby setting the unit interrupt flip-flop 313. The set output from flip-flop 313 is combined with the set output from flip-flop 301 to provide a logical "1" input to NOR circuit 323. The input to NOR circuit 324 remains a logical "0," even though the set output from flip-flop 305 is a logical "1" and the set output from flip-flop 313 is a logical "1," because the third signal applied to the AND gate input of NOR circuit 324 is the clear output from flip-flop 301. Since clear output line 316 from flip-flop 301 is a logical "0," the input to NOR circuit 324 remains disabled. Output line 316 is applied to the AND gate inputs of NOR circuit 325 and 326, thereby disabling the inputs to both of these NOR circuits. Since NOR circuit 323 has the only logical "1" input, its output will determine the binary signals which are transmitted from the dimension logic NOR transmitter circuits. From the circuit arrangements described, it can be seen that the end-of-tape interrupt signal has priority over all other interrupt signals. It can also be seen that the error interrupt signal has priority over the end-of-operation and the ready interrupt signals. The end-of-operation interrupt signal has priority over the ready interrupt signal, and the ready interrupt signal has the lowest priority of all the interrupt signals.

Figure 4:
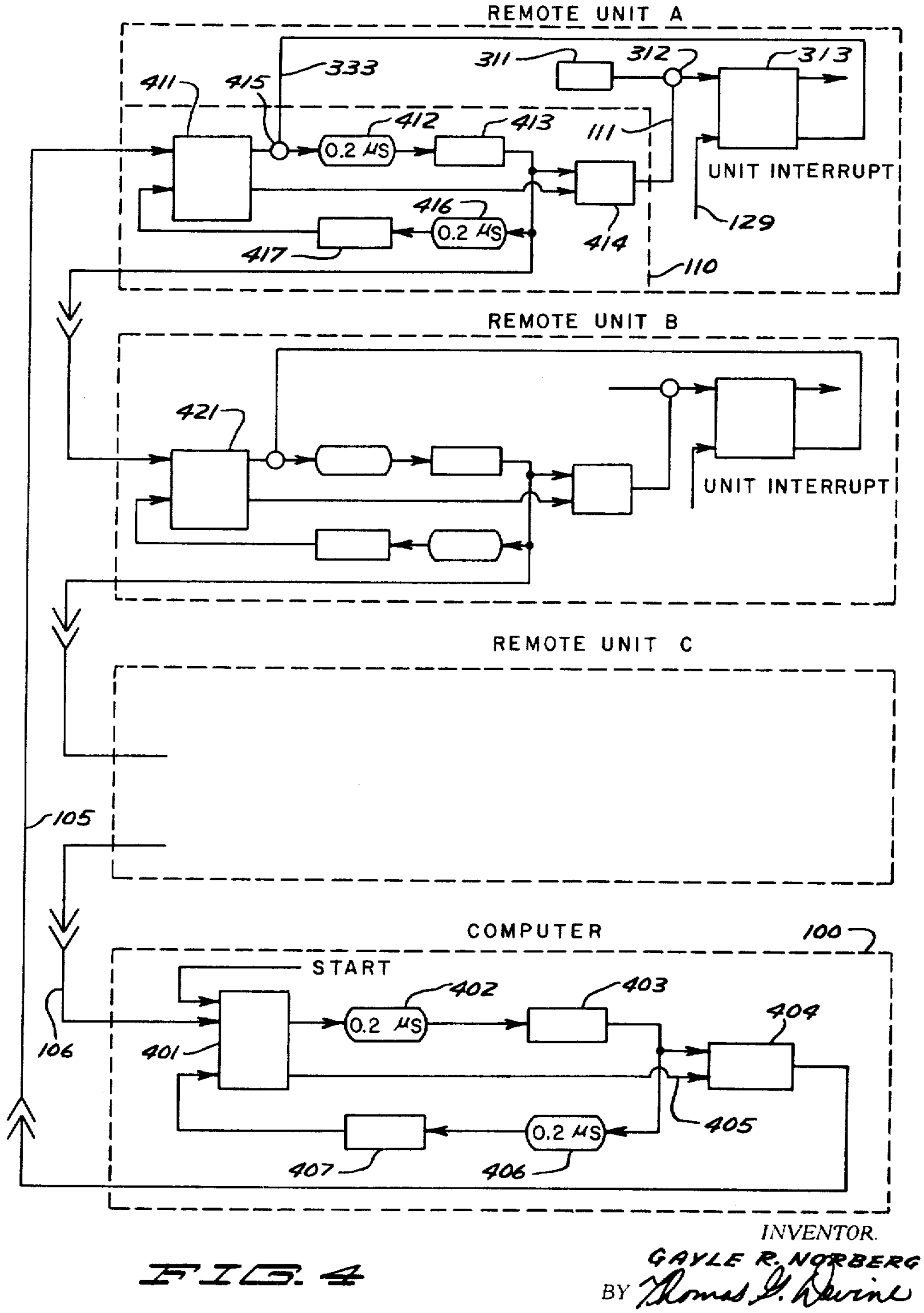
FIGURE 4 illustrates the unit priority logic and the interconnections of this logic between the remote units and the computer.

FIGURE 4 illustrates the interconnections between the unit priority logic of each of the remote units and the central computer. It can be seen that the remote units are connected via the unit priority line 105 in a series arrangement, with the last remote unit connected back to the computer via line 106. FIGURE 4 illustrates three remote units, although any number of remote units could be connected in the same manner as shown. The operation of the unit priority system is begun by the receipt of a start signal, which sets flip-flop 401. This start signal is generated by appropriate logic within the computer, which logic is conventional and well-known in the art. When flip-flop 401 sets, clear output 405 becomes a logical "0," which is applied to the input of NOR circuit 404. Since the other input to NOR circuit 404 is also a logical "0," its output becomes a logical "1." This output signal is passed to Remote Unit A via line 105. The set output of flip-flop 401 as applied to delay 402, causing a logical "0" to appear at the output of delay 402 0.2 microseconds later. This delayed signal is applied to NOR circuit 403, causing a logical "1" output which is applied to the input of NOR circuit 404. This causes the output of NOR circuit 404 to become a logical "0," thus removing the unit priority signal from line 105 0.2 microseconds after it was applied to line 105. The logical "1" output from NOR circuit 403 is also applied to delay 406, and causes a logical "0" output to appear 0.2 microseconds later. This delayed signal is applied to NOR circuit 407, causing a logical "1" at its output, which clears flip-flop 401, returning the circuit to its original state. Thus, the signal applied to line 105 is a logical "1" which is 0.2 microseconds in duration. This signal sets flip-flop 411 in Remote Unit A, causing the clear output of flip-flop 411 to become a logical "0" and the set output to become a logical "1." The clear output is applied to one input of NOR circuit 414 and, since the other input to NOR circuit 414 is also a logical "0," causes a logical "1" to appear at its output. The output from NOR circuit 414 is connected via line 111 to AND gate 312 (see FIGURE 3) to enable the setting of unit interrupt flip-flop 313 if any interrupt signals have been generated by the interrupt sources of Remote Unit A. If an interrupt were active, NOR circuit 311 would have a logical "1" output and, upon application of the logical "1" output signal from NOR circuit 414, flip-flop 313 would become set. The clear output from flip-flop 313 would therefore become a logical "0" and would disable AND gate 415 via line 333. When this AND gate becomes disabled, the unit priority signal is inhibited from passing on to the next remote unit until the Remote Unit A active interrupt is processed by the computer. After the active interrupt is processed by the computer, a unit clear signal is sent from the computer over line 129 which causes flip-flop 313 to become clear and returns the clear output of flip-flop 313 to a logical "1" state. AND gate 415 is then enabled, allowing a logical "1" to appear at the input of delay 412. The output of delay 412 becomes a logical "0" 0.2 microseconds later, causing the output of NOR circuit 413 to become a logical "1." The output from NOR circuit 413 is connected to NOR circuit 414, causing a logical "0" output, and to delay circuit 416, causing a logical "0" output to occur 0.2 microseconds later. The logical "0" output from NOR circuit 414 disables AND gate 312 and prevents the unit interrupt flip-flop 313 from becoming set by further active interrupts. The output from delay circuit 416 is applied to NOR circuit 417, causing a logical "1" to appear at the output of NOR circuit 417 and clearing flip-flop 411.

The logical "1" output from NOR circuit 413 is also transmitted to Remote Unit B; more specifically, to the set input of flip-flop 421. The setting of flip-flop 421 allows active interrupts within Remote Unit B to be recognized by setting the unit interrupt flip-flop in Remote Unit B in the same manner as described above in Remote Unit A. If no active interrupts exist in Remote Unit B, or after the active interrupts in Remote Unit B have been processed, the unit priority signal is transferred from Remote Unit B to Remote Unit C, where similar functions are performed with respect to Remote Unit C. When the last remote unit has been serviced in this manner, the unit priority signal is transferred over line 106 back to the computer, where it sets flip-flop 401. The setting of flip-flop 401 causes its connected logic to generate a new unit priority signal, which is again passed to the first remote unit via line 105. The entire process is then repeated again, and provides a continuous periodic recognition of interrupts in all remote units.

Figure 5:
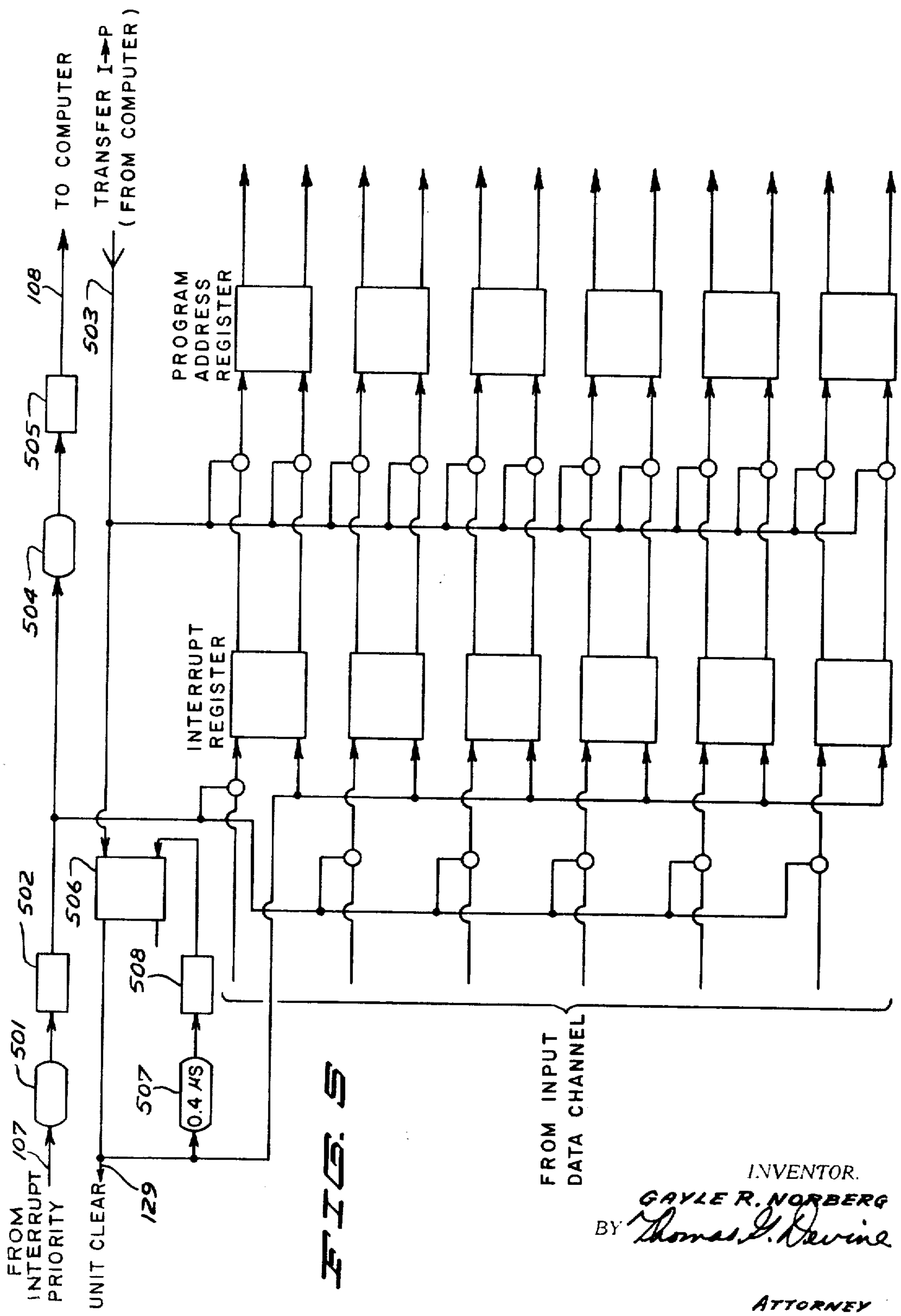
FIGURE 5 illustrates the interrupt control logic and interrupt register contained within the computer.

FIGURE 5 illustrates the interrupt register 102 and a portion of the interrupt control logic 104. The set inputs of each of the interrupt register flip-flops are connected to lines from input data channel 101. The binary signals on these lines are gated into the respective interrupt register flip-flops by a signal transmitted to interrupt control 104 from the unit interrupt flip-flop in the remote unit. This signal arrives on line 107 (FIGURE 5) and is applied to the input delay 501. After an appropriate time delay, the output of delay 501 becomes a logical "0" and is applied to NOR circuit 502, where it causes a logical "1" output. The output of NOR circuit 502 is applied to enable the set input AND gates of each flip-flop in the interrupt register. The other input connected to each flip-flop AND gate is connected to input data channel 101, and each input data channel 101 wire which has a logical "1" applied will cause the respective interrupt register flip-flop to become set. Once the interrupt register has stored the information contained on input data channel 101 lines, the contents of the interrupt register may be gated to the computer program address register (or elsewhere within the computer) at a time determined by computer operation. Thus, for example, the transfer I→P signal shown in FIGURE 5 is illustrated as a typical computer-generated signal which may be used to gate the contents of the interrupt register to the program address register. The signal is applied to line 503 and subsequently to the register set input and clear input AND gates of each of the program address register flip-flops. The signal is shown merely to illustrate one possible way of transferring information from the interrupt register to the computer, and is not intended to limit the scope of this invention.

Consider again the unit interrupt signal received on line 107 from the remote units. After this signal passes through delay 501 and NOR circuit 502, it is simultaneously applied as a gating signal to the inputs of the interrupt register and to delay 504. After a suitable time delay, delay 504 provides a logical "0" output to NOR circuit 505, which inverts the signal and provides a logical "1" output on line 108. Line 108 is connected to other computer circuits (not shown), and serves to alert the computer that an interrupt dimension has arrived and is stored in the interrupt register. Upon receiving this signal from line 108, the computer will energize appropriate circuits as described above to gate the contents of the terrupt register and to delay 504. After a suitable time register. These computer circuits cause line 503 to become activated and provide the program address register gating signal described earlier. Line 503 is also connected to the set input of flip-flop 506, where it is used to generate a unit clear signal which is transmitted to all remote units. The signal on line 503 causes flip-flops 506 to become set. The set output of this flip-flop is connected to line 129, which in turn is connected to the clear inputs of all remote unit flip-flops (see FIGURE 3). The set output of flip-flop 506 is also connected, via delay 507 and NOR circuit 508, to the clear input of flip-flop 506. This signal path serves to apply a delayed clear signal to flip-flop 506, thereby returning it to its initial state after it has been set for a period of time determined by delay 507. The time duration of the unit clear signal on line 129, which is present for only as long as flip-flop 506 is set, therefore determined by delay 507.

It will be understood that the above-described embodiment may be expanded to include any number of interrupt sources, and remote units. It will also be understood that the number of binary bits used in the dimension logic is a matter of design choice and need not be restricted to six. Further, the logic shown within a remote unit may also be placed within the computer itself to accommodate interrupts which are generated internally. Computer-generated interrupts may be processed within the scope of this invention in the same manner as described for remotely generated interrupts.

The above illustrative embodiment comprises a preferred embodiment of the invention. However, this illustration is not intended to limit the possibilities of insuring features of the invention. The dimensioned interrupt system disclosed herein is an example of an arrangement in which the inventive features of this disclosure may be utilized and it will become apparent to one skilled in the art that certain modifications may be made within the spirit of the invention as defined by the appended claims.

What is claimed is:

1. In a computing system having at least one central processor having a memory and a program control register for the memory, and a plurality of remote devices connected to the central processor, the improvement comprising;

(a) means for generating an interrupt signal at each one of the remote devices;

(b) means at each one of the remote devices for generating a plurality of possible combinations of binary signals in response to each interrupt signal;

(c) means, at each one of the remote devices, for selecting one combination of binary signals from the plurality of possible combinations of binary signals, the selected combination corresponding to one address in the central processor memory;

(d) transmisison means connected to each of the selection means and to each of the interrupt signal generating means for simultaneously transferring the interrupt signal and the selected combination of binary signals to the central processor; and (e) central processor means for transferring the selected combination of binary signals to the program control register for the central processor memory.

2. In combination:

(a) a plurality of interrupting devices capable of communicating with a computer central processor having a memory and a program control register for the memory;

(b) a plurality of dimensioned interrupt devices, each connected to one or more of the interrupting devices, each for converting one of a possible plurality of signals from one or more of the connected interrupting devices into a single combination of binary signals for transmission to the computer central processor;

(c) a reservation system for selecting and permitting only one dimensioned interrupt device to transfer the single combination of binary signals to the computer central processor at any one time; and (d) computer central processor control means for transferring the single combination of binary signals into the program control register for the computer central processor memory.

3. A combination as set forth in claim 2 wherein the reservation system comprises:

(a) means for generating a unit priority signal for transmission to a first one of the dimensioned interrupt devices;

(b) receiving means within each of the dimensioned interrupt devices for receiving the unit priority signal;

(c) transfer means connected to each of the receiving means for transferring the unit priority signal to a successive dimensioned interrupt device when no interrupt signals are generated by the interrupting devices connected to the first one of the dimensioned interrupt devices, and to inhibit the transfer of the unit priority signal to a successive dimensioned interrupt device when interrupt signals are generated by the interrupting device connected to the first one of the dimensioned interrupt devices until the single combination of binary signals has been transferred from the first one of the dimensioned interrupt devices to the computer central processor;

(d) interconnection means connecting the transfer means of each of the dimensioned interrupt devices to the receiving means of the next successive dimensioned interrupt device, for providing a series path through all of the dimensioned interrupt devices; and (e) terminating means connecting the transfer means of the last successive dimension interrupt device to the means for generating the unit priority signal, providing a termination of the series path through all the dimensioned interrupt devices and a reactivation of the means for generating the unit priority signal.

4. A combination as set forth in claim 3 wherein the dimensioned interrupt devices each include:

(a) means for receiving interrupt signals from interrupting devices;

(b) gating means coupled to the means for receiving interrupt signals and to the reservation system transfer means for inhibiting the transfer means when an interrupting signal is present; and (c) interrupt priority means connected to the reservation system receiving means for selecting a single interrupt signal from a single interrupting device in response to the unit priority signal.

5. A dimensioned interrupt apparatus located remotely from a computer processor for interrupting the normal sequence ol operation of the computer processor in response to an interrupt signal generated by any one of a plurality of interrupting devices comprising:

(a) priority means connected to the interrupting devices, for selecting one of a plurality of interrupt signals from the interrupting devices according to a predetermined heirarchy of interrupting device rank;

(b) encoding means selectively coupled to the plurality means for converting the selected interrupt signal into a single combination of binary signals, the encoding means including a matrix of logic elements and having a plurality of input lines individually responsive to different interrupt signals and having a plurality of output lines for transmitting the single combination of binary signals, the matrix of logic elements being interconnected so as to energize a different combination of output lines in response to the interrupt signals impressed upon each of the input lines;

(c) transmitting means connected to the encoding means output lines for transmitting the single combination of binary signals to the computer processor.

References Cited

UNITED STATES PATENTS

| | | | |
|---|---|---|---|
| 2,980,898 | 4/1961 | Mason et al. | 340—408 XR |
| 3,159,816 | 10/1964 | Tiemann | 340—408 XR |
| 3,344,401 | 9/1967 | MacDonald et al. | 340—172.5 |
| 3,407,387 | 10/1968 | Looschen et al. | 340—172.5 |
| 3,434,111 | 3/1969 | Schmidt et al. | 340—172.5 |
| 3,243,781 | 3/1966 | Ehrman et al. | 340—172.5 |
| 3,245,045 | 4/1966 | Randlev | 340—172.5 |
| 3,290,658 | 12/1966 | Callahan et al. | 340—172.5 |
| 3,336,582 | 8/1967 | Beausoleil et al. | 340—172.5 |
| 3,370,276 | 2/1968 | Schell | 340—172.5 |

PAUL J. HENON, Primary Examiner

H. E. SPRINGBORN, Assistant Examiner